Sept. 5, 1961          J. SCHÜNACK         2,999,166
METHOD OF MECHANICALLY DETECTING A MARK AFFIXED TO A DOCUMENT
Filed Aug. 27, 1957                        4 Sheets-Sheet 3
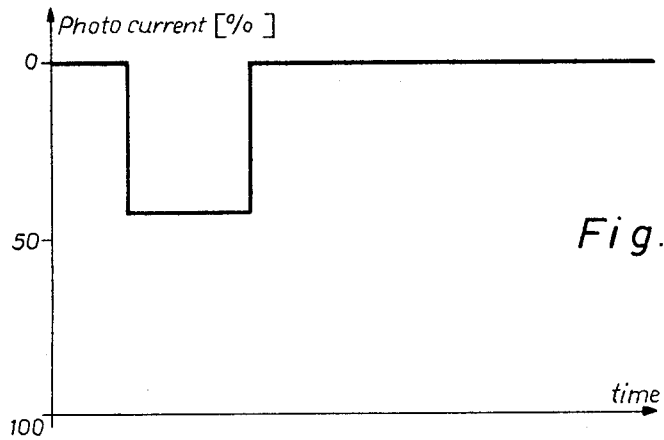
Fig. 6
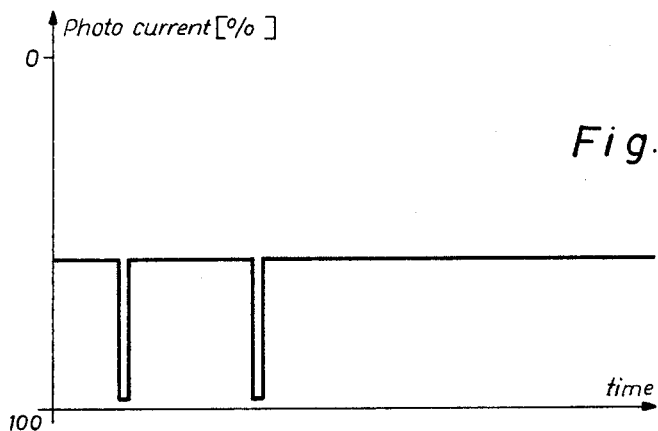
Fig. 7
INVENTOR
J. SCHUNACK
BY 
ATTORNEY Sept. 5, 1961 J. SCHÜNACK 2,999,166
METHOD OF MECHANICALLY DETECTING A MARK AFFIXED TO A DOCUMENT
Filed Aug. 27, 1957 4 Sheets-Sheet 4

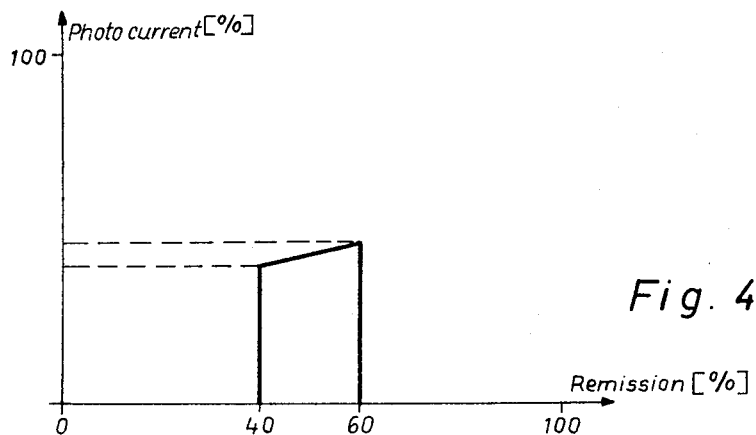
Fig. 4
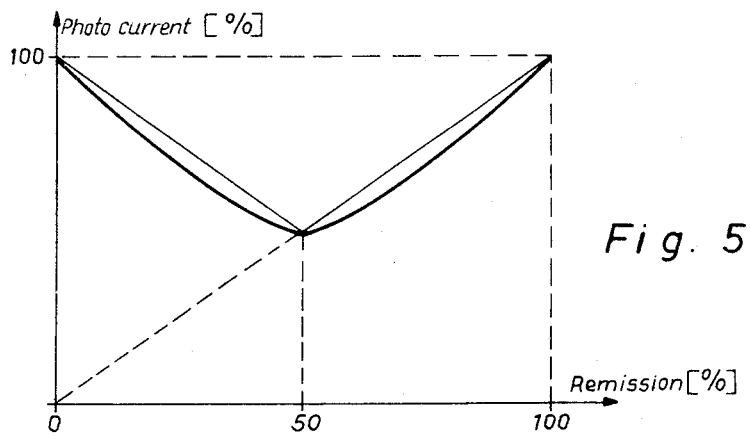
Fig. 5
INVENTOR
J. SCHUNACK
BY
ATTORNEY

INVENTOR
J. SCHÜNACK
BY
ATTORNEY

2,999,166
METHOD OF MECHANICALLY DETECTING A MARK AFFIXED TO A DOCUMENT

Johannes Schünack, Berlin-Lichterfelde, Germany, assignor to International Standard Electric Corporation, New York, N.Y., a corporation of Delaware
Filed Aug. 27, 1957, Ser. No. 680,440
Claims priority, application Germany Sept. 21, 1956
4 Claims. (Cl. 250—219)

The invention relates to a method of mechanically detecting a mark affixed to any kind of document, in particular of detecting a postage stamp affixed to the envelope of a letter.

For the sorting of letters, checks, bank-notes, or the like, according to places of destination, bearer or name of holder, number, etc., it is at first required that the letters, documents or the like are placed in a readable position for conveying them in this position on a conveyor belt past the sorting operator. Such items to be sorted, of course, are capable of assuming one of four different positions on the belt, provided that edgewise travelling items have already been laid down. Before it is possible to start with the sorting process, therefore, the problem arises of recognizing the position of the item and, if necessary, of bringing it into the readable position. Of course, this can be done visually, but all efforts are being made for recognizing the position with the aid of mechanical means. To this end there is required a sort of distinguishing mark which definitely characterises the position of the respective item to be sorted, and is capable of being mechanically evaluated. In the case of letters there is provided as the most ideal distinguishing mark the postage stamp, so that in these cases it is merely the problem of determining the stamp location. In most cases, normally, it may be taken that the stamp is affixed to the upper right-hand corner on the front side of the envelope.

The invention, therefore, is particularly concerned with a method of detecting a mark affixed to an item to be sorted, in particular of detecting a postage stamp affixed to a letter. In the prior art it has already been proposed to scan the item as well as the mark either electronically or photo-electrically, and to utilize the result of such a scanning operation for controlling the subsequently following operating processes, in the course of which the items are sorted in accordance with their respective positions.

In a photo-electric scanning the items on the conveyor belt are led past the scanning device and are irradiated by a light beam from a light source. The reflected light is received by a photocell and is converted into electric currents corresponding to the intensity of the light. During the scanning of the mark there will appear differences in intensity between the mark and the surrounding parts of the item, which may be utilized for determining the position. For obtaining high contrasts between the mark and the remaining portions of the item there may also be used colour filters either on the light-beam emitting or receiving side.

The present invention, in particular, relates to a method of recognizing a postage-stamp with the aid of a photo-electric scanning. The invention is based on the cognizance that the remission ability of all German and foreign postage-stamps which are in use at present lies within a medium limited range between about 40 and 60%, whereas brightly coloured envelopes have a remission ability of more than 60%, and less coloured envelopes have a remission ability of less than 45%. By the term "remission ability" there is to be understood the relative amount of reflected light measured at an angle of substantially 45° in relation to the vertically impinging light of the light source. In this respect it is to be noted that the remission ability relates to the entire surface of the postage-stamp excluding any possibly existing sticking edge. On account of this cognizance the stamp location can be determined when it is possible to distinguish the remission ability of 40–60% with a sufficient reliability with respect to the remaining portions of the letter or envelope.

According to the invention, therefore, the current of the photocell, or a signal current derived therefrom or released thereby, and corresponding to the remission of light, is fed to an amplitude-controlled electric device which is designed in such a way that the signal current will obtain characteristic values for the mark and/or the edge of the mark, which may then be utilized for detecting, respectively for determining the location of the distinguishing mark.

By way of example, the amplitude-controlled device may be designed in such a way that the signal current is suppressed up to a remission ability of 40%, while rising slightly at a remission ability between 40 and 60%, but rising very rapidly in the case of a remission ability exceeding 60%. To this end it may be of advantage to employ tubes with a characteristic having a sharp or strong bend.

It is still more appropriate to choose the amplitude-controlled device thus that only such signal currents are either permitted to pass or are suppressed, which correspond to the remission ability of the respective mark.

A further possibility of specially characterising the signal current corresponding to the mark consists in determining the amplitude-controlled members in such a way that the curve of the signal current remission is bent at a point corresponding to a remission ability of 50%, so that by the remission ability of 0% there is produced the same signal current as by a remission ability of 100%.

By evaluating the signal current it will then be possible to determine when there appears a jump with respect to the beginning of mail item.

Since in all of these cases there is supposed to be characterized the remission ability of the distinguishing mark (postage-stamp) the items have to be scanned by a photocell of the surface scanning type which will not respond to any variations in brightness of the mark itself. In this way the method, due to the described amplitude-controlled device, can be readily employed for the scanning of bright-coloured mail items etc.

In the case of dark-coloured items the mark, as a rule, cannot be distinctly characterized with respect to the item anymore in the manner as described above, because the remission ability or capacity of both the mark and the item (envelope) is lying within almost the same range. The method according to the invention, however, can also be used for the scanning of dark-coloured items, as long as the marks have a bright-coloured edge and when the scanning is effected with the aid of a photocell of the gap or slit scanning type. Because when employing such means it is rendered possible that the edge of the mark is characterized with respect to the remaining portions of the mark and the item.

Therefore, in the case of dark-coloured items, it is appropriate to choose the amplitude filtering means in such a way that only the signal current having a remission capacity of more than 60% is either permitted to pass or is suppressed. Upon scanning there will then be produced two narrow impulses which correspond to the edges of the mark and which may then be utilized for determining the location of the mark.

Since in practice there are to be expected both bright-coloured as well as also dark-coloured mail items it is advisable to consider both possibilities, viz. there should be provided two scanning devices of which the one contains the photocell of the surface scanning type, while the other one contains that of the slit scanning type. Of course, it is also possible to only employ one scanning device with one photocell of the slit scanning type only, when respectively integrating over the width of the marks when evaluating the scanning of bright-coloured items. The amplitude-controlled elements may be of the same type for both kinds of evaluations but, of course, it is also possible to employ different amplitude filtering means for bright-coloured and dark-coloured items. Thus it is of advantage to provide for the evaluation of bright-coloured items amplitude filtering means with a pass range for a signal current corresponding to the remission capacity of the mark, and for the evaluation of dark-coloured items amplitude filtering means with a pass range for a signal current corresponding to the remission capacity of the edges of the mark.

When employing a combined type of scanning device then, depending on the brightness of the item, a switching over will have to be performed to either the one or the other path. This may be effected either on account of a visual inspection or mechanically.

The invention relates to improved apparatus for detecting a distinguishing mark on an object having predetermined remission characteristics. This is achieved by providing a photoelectric scanning device which detects light which is reflected or remitted from scanned objects. The remitted light is picked up by a photoelectric cell whose output amplitude varies in accordance with the variations in remitted light. A first signal circuit is provided which responds only when signals above a predetermined amplitude are received. Signals of this nature may be caused by a light-colored envelope or light-colored stamp edges which have high remissive characteristics. A second signal circuit is provided which responds only when signals within a predetermined amplitude range are received. Signals of this nature may be caused by a dark-colored envelope or a dark-colored portion of a stamp which have low remission characteristics. The outputs of these circuits energize a utilization device for performing various functions.

In the following the invention will be described in particular with reference to FIGS. 1 through 7 of the accompanying drawings. As an example there has been chosen the detecting of the location of the postage-stamps on a letter. In the drawings FIG. 1 is a diagram showing the dependency of the photo current upon the light remission;

FIGS. 2–5 are the diagrams of the curves of respectively the photo current or signal current distorted in amplitude-controlled devices;

FIG. 6 shows the curve of the signal current during the scanning of a bright-coloured letter in the proper readable position, by employing amplitude filtering means only permitting the passage of the signal current corresponding to the remission of the postage-stamp;

Figure 8:
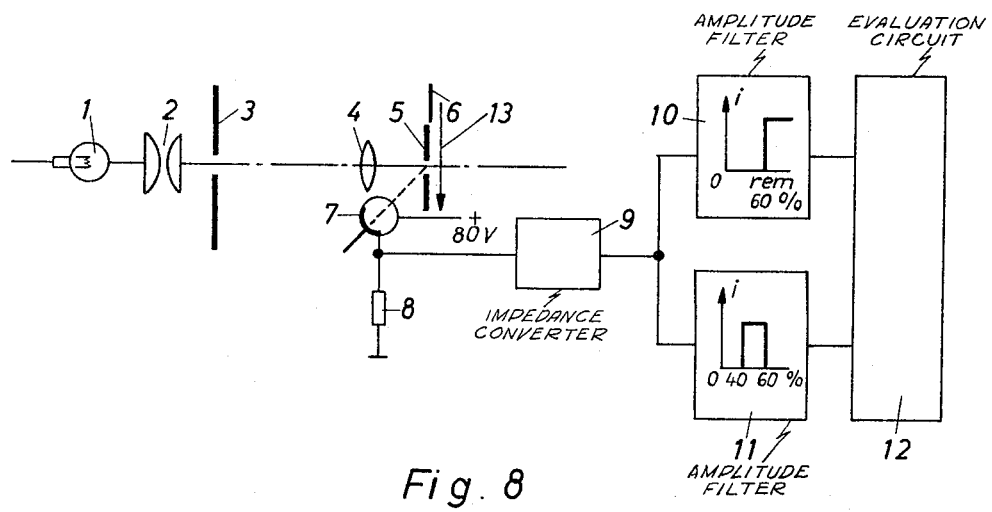

FIG. 7 shows the curve of the signal current during the scanning of a dark-coloured letter in the proper readable position, by employing amplitude filtering means only permitting the passage of a signal current produced by a remission capacity which is greater than the remission capacity of the postage-stamp, and FIG. 8 shows a schematical representation of an arrangement for producing the identification signals.

Figure 1:
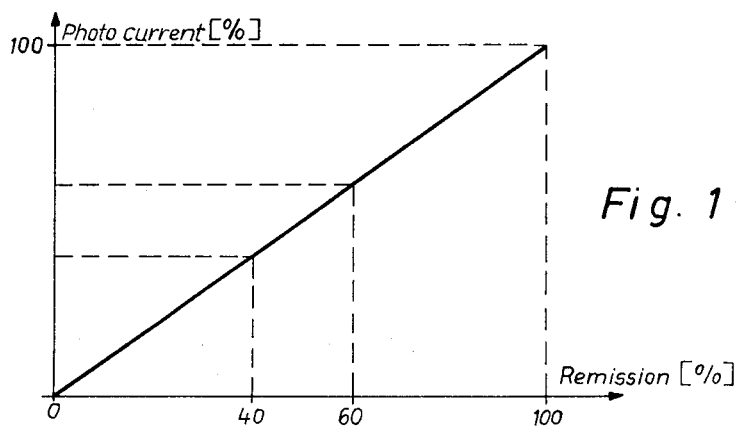
Figure 2:
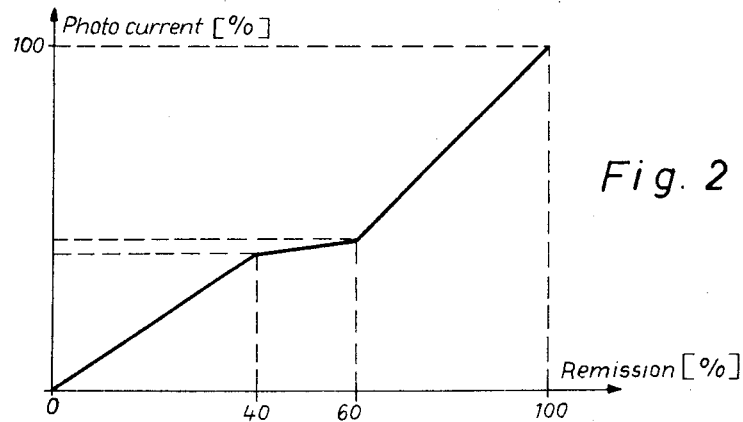

FIG. 1 shows in a diagram the linear dependency of the photocell current upon the remission of light. The remission as well as the photocell current are respectively indicated in percent. For a white surface there is assumed a remission of 100%, and for a black surface there is assumed a remission of 0% and, accordingly, a signal current of 100% or 0% respectively. As already mentioned in the foregoing, the present invention is based on the cognizance that the remission capacity of all postage-stamps, which are in use at present, ranges between 40 and 60%. This area is particularly shown in FIG. 1 of the drawings. Hence for recognizing a stamp it can be attempted to determine this portion of the curve in the course of the scanning operation. In the case of a linear curve, however, this will prove to be relatively difficult, perhaps even impossible. According to the invention, therefore, the linear curve is distorted in such a way that the range of 40–60% of remission will distinctly differ from the remaining portions of the straight line. As will be seen from the diagram of FIG. 2 the photo current is in such a way subjected to a distortion that, within the range of 40–60% of remission there will only result a very slight or nearly no change of the signal current at all.

Figure 3:
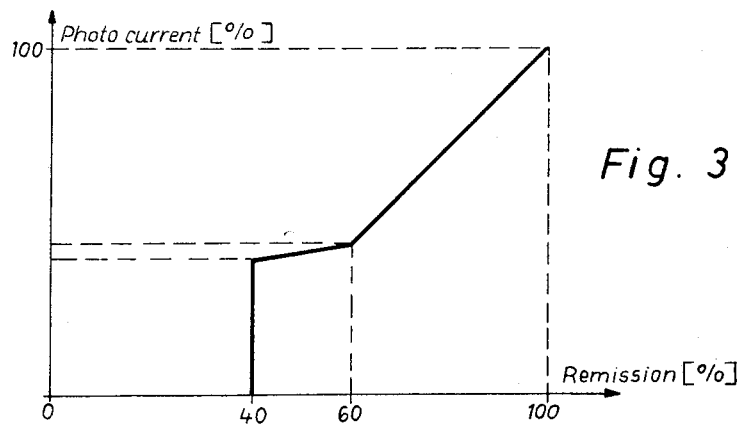

In FIG. 3 of the drawings there is illustrated the case in which the signal current is suppressed below the 40% remission capacity, and is only subjected to a slight change between 40 and 60%, for rising rapidly in a linear fashion from 60% onwards. Such a curve can be easily imaged by means of an electron tube having a corresponding characteristic. Another simple, technical solution consists in completely suppressing the signal current up to 60% of remission. In the case of bright-coloured letters, however, this may be of a disadvantage insofar as also other recordings or labels, e.g. air-mail labels, may easily simulate a mark. It, therefore, is more appropriate to use amplitude filtering means which only permit the passage of a signal current corresponding to the remission capacity of the postage-stamp. In this way there will then be avoided any faulty evaluations. The curve of the signal current resulting from such an arrangement is shown in FIG. 4 of the drawings.

The amplitude distortion device can also be arranged in such a way that the curve of FIG. 1 is bent round the point corresponding to a remission of 50%. The signal current will then have a parabola-shaped curve, as will be seen from the diagram of FIG. 5. Within the range of the parabola vertex, i.e. at a remission capacity of about 40–60% the signal current is only subjected to slight changes. At the end point of the parabola arms or branches, which correspond to a remission of 100%, are the white and the dark portions of the letters. In this way it will also be avoided that e.g. by air-mail labels there will be simulated a postage-stamp, because only at the scanning of a postage-stamp there will be effected a jumping of the signal current. The curve in FIG. 5, for example, can be imaged by two diodes with opposite polarity being connected together in the corresponding manner.

Hence in all cases it is the problem to specially and distinctly characterize a certain range of the curve of the signal current, so that it is the object of the evaluation to detect this range. As a rule the amplitude-controlled or amplitude-dependent members are designed in a way that there will be caused a jump of the curve which is capable of being determined. In the case of bright-coloured letters, as already mentioned, the area of the postage-stamp can be characterized when using amplitude filtering means having a pass range between 40 and 60% of remission capacity. There will then result a signal current curve as shown in FIG. 6, provided that there has been scanned a white letter without any other labels or prints etc.

In the case of dark-coloured letters that range of the signal current curve has to be specially characterized, which corresponds to the white value, because the postage-stamp and the surface of the letter cannot be distinguished. This is accomplished by way of an amplitude filtering means with a pass range or pass band for more than 60% of remission-capacity. The curve of the current resulting therefrom is shown in FIG. 7 of the drawings. This likewise refers to a letter to which, besides the postage-stamp, there are affixed no other labels etc. The two pulses are caused by the edges of the stamp.

Furthermore it is taken as a matter of fact in both cases that the letters are led in a readable position past the scanning device, hence that the postage-stamp is affixed to the upper righthand corner of the letters. The evaluating device is adapted to measure the photocell current and determines where the jump occurs. From FIGS. 6 and 7 it will also be seen that the scanning in the case of bright-coloured letters has to be effected with the aid of photocells of the surface scanning type, while the scanning in the case of dark-coloured letters has to be performed with the aid of photocells of the slit scanning type.

In FIG. 8 of the drawings there is schematically shown an arrangement which may be used for producing the identification signals.

The tungsten filament lamp 1 uniformly illuminates, from above an optical condenser 2, a gap 3 in a plane extending vertically in relation to the optical ray path. With the aid of a single or multisectional optic 4 this gap is thrown on to the plane 6 of the letter, and in this plane there is produced a gap extending vertically in relation to the direction of movement of the letter, which is indicated by the arrow 13. If there is no letter behind the gap then the light will be permitted to pass through the gap and no part thereof can be reflected. However, if a letter is behind the gap 5 then the impinging light rays will be reflected by the letter surface and a portion of this light will hit the light-sensitive layer of the photocell 7 which, most appropriately, is a vacuum photocell. To the anode of this cell there is fed an accelerating or driving voltage of e.g. 80 volts. Under the influence of the light reflected by the letter surface there is produced in the photocell an electric current, the value of which respectively is determined by the remission behaviour of the letter behind the gap. If the surface of this letter is white then there will be released a very great current, but if the letter surface is of some darker colour, then only a correspondingly smaller current will be released. The current of the photocell produces at the resistance 8 a voltage, the magnitude of which increases as the remission property of the letter surface increases. For obtaining a high as possible voltage the resistance value of 8 is to be chosen as high as possible, e.g. about 1 megohm. In the following impedance converter 9, e.g. a cathode stage, the equisized and equiformed signal is produced at a low ohmic resistance of e.g. 1000 ohms and is now available for releasing further electrical processes. An example of the impedance inverter 9 or cathode stage is shown on page 426, FIGS. 11–12 and is described on page 430, in Vacuum Tube Amplifiers, vol. 18 of the "Radiation Laboratory Series," published by McGraw-Hill. To this impedance converter there are connected two amplitude filters 10 and 11. The output of 10 does not conduct any current in the case of small input voltages, i.e. in the case of low remission values of the letter surface, but conducts a fixed maximum current in the case of remission values of e.g. above 60%. Thus, as soon as the remission exceeds this value a corresponding current will be supplied by the filter. Hence this will be the case in the event of e.g. a white letter surface, or when detecting the white edge or margin of the postage stamp. The second amplitude filter 11 does not supply a current neither at the low nor at the high remission values, but only in the intermediate range, i.e. between 40 and 60% of remission. In other words, this second filter 11 will deliver a current as soon as a dark letter or postage stamp appears in the window of the gap 5. To the output terminals of 10 and 11 there is connected the evaluation circuit 12. The amplitude filters 10 and 11 as well as this evaluating circuit 12 are of the conventional type and well-known to the person skilled in the art. Examples of the amplitude filters 10 and 11 may be found on page 330, figures "a" and "b" respectively, in Wave Forms, volume 19 of The Radiation Laboratory Series published by McGraw-Hill.

For the measuring of the remission of light there may be used vacuum type photocells having such a colour sensitivity, that the greatest number of letters will be recognized correctly. To this end there are most suitable for employment such types of photocells which are particularly sensitive to the colours red and blue. The colour sensitivity of the employed light source and the light sensitivity of the photocell will have to be chosen a.o. in such a way that the interval of the remission, to which the postage-stamps belong, becomes as narrow as possible, so that the difference with respect to the other portions or ranges becomes as great as possible. These conditions can still be made more favourable, when using additional colour filters.

In the foregoing the invention has been described with reference to the detecting of postage-stamps. Of course, the invention is also applicable to the detecting of other kinds of marks affixed to printed or written or mail items, provided that these marks, or parts of these marks respectively, have defined ranges or portions of remission differing from the remission of the remaining parts or portions of the respective item.

What is claimed is:

1. In apparatus for detecting a distinguishing mark on an object, said mark having predetermined remission characteristics different from those of the adjacent parts of said object, said apparatus comprising a photoelectric scanning device for scanning said object and including a photocell responsive to light remitted by both said mark and said object for providing electrical signals dependent in magnitude upon the amount of remitted light falling on said photocell, non-linear, signal amplitude responsive means connected to said scanning device for converting the photocell signals having a predetermined amplitude and corresponding to said mark into output signals and being unresponsive to the photocell signals having an amplitude less than said predetermined amplitude, and means connected to said signal amplitude responsive means and responsive to said output signals.

2. In apparatus for detecting a distinguishing mark on an object, said mark having predetermined remission characteristics different from those of the adjacent parts of said object, said apparatus comprising a photoelectric scanning device for scanning said object and including a photocell responsive to light remitted by both said mark and said object for providing electrical signals dependent in magnitude upon the amount of remitted light falling on said photocell, non-linear, signal amplitude responsive means connected to said scanning device for converting the photocell signals having a predetermined amplitude and corresponding to said mark into output signals and being unresponsive to the photocell signals having an amplitude different from said predetermined amplitude, and means connected to said signal amplitude responsive means and responsive to said output signals.

3. In apparatus for detecting a distinguishing mark on an object, said mark having a predetermined light remission characteristic, a photoelectric scanning device for scanning said object and including a photocell responsive to light remitted by both said mark and said object for providing electric signals varying in magnitude dependent upon the amount of remitted light falling on said photocell, non-linear signal amplitude responsive means connected to said scanning device for holding said photocell signals falling within the range of the predetermined light remission characteristic of said mark relatively constant with respect to the photocell signals due to the light remitted by said object and utilization means connected to said signal amplitude responsive means responsive to the output signals having a predetermined amplitude.

4. In apparatus for detecting a distinguishing mark on an object, said mark having at least one portion having predetermined remission characteristics different from those of the adjacent parts of said object and different from those of the remainder of said mark, said apparatus comprising a photoelectric scanning device for scanning said object and including a photocell responsive to light remitted by said portion of said mark, said remainder of the mark and said object for providing electrical signals dependent in magnitude upon the amount of remitted light falling on said photocell, non-linear signal amplitude responsive means connected to said scanning device for holding said photocell signals falling within the range of the predetermined light remission characteristic of said mark relatively constant with respect to the photocell signals due to the light remitted by said one portion of said mark, and utilization means connected to said signal amplitude responsive means responsive to the light remitted by said one portion of said mark.

References Cited in the file of this patent

UNITED STATES PATENTS

| | | |
|---|---|---|
| 1,729,521 | Roddy | Sept. 24, 1929 |
| 2,665,388 | Bickley | Jan. 5, 1954 |
| 2,675,488 | Bickley | Apr. 13, 1954 |

FOREIGN PATENTS

| | | |
|---|---|---|
| 468,448 | Great Britain | July 6, 1937 |
| 675,556 | Great Britain | July 16, 1952 |